H. J. WATTS.
DRILL OR BORING MEMBER.
APPLICATION FILED NOV. 1, 1916.

1,241,176. Patented Sept. 25, 1917.

WITNESS

INVENTOR.
Harry J. Watts
By Max H. Sroling

UNITED STATES PATENT OFFICE.

HARRY J. WATTS, OF TURTLE CREEK, PENNSYLVANIA.

DRILL OR BORING MEMBER.

1,241,176.

Specification of Letters Patent.    Patented Sept. 25, 1917.

Application filed November 1, 1916.   Serial No. 128,880.

*To all whom it may concern:*

Be it known that I, HARRY J. WATTS, a subject of the King of England, residing at Turtle Creek, county of Allegheny, and State of Pennsylvania, have invented certain new and useful Improvements in Drills or Boring Members, of which the following is a specification.

This invention relates to drills or boring members designed primarily for forming polygonal shaped openings, and has for its object to provide a tool of such type, in a manner as hereinafter set forth, with eccentric end cutting edges and further with means to prevent clogging of the chips during the operation of the tool so as not to retard the movement of the latter when operating.

When drilling or boring polygonal shaped openings a master guide is employed and through which operates the tool and the latter is formed with one less land than the number of walls of the opening of the master guide through which the tool operates, and it is a further object of the invention to provide a drill or boring member with the lands thereof having the periphery curved and disposed eccentrically with respect to the axis of the tool, whereby during the operation of the tool, the eccentrically curved peripheries of the lands will follow the walls of the opening in the master guide to prevent extended or rounded corners at the junction of the walls of the polygonal shaped opening being formed in the work.

A further object of the invention is to provide a tool for the purpose set forth with a shank having means for securing it in a cylindrical or squared tool socket.

A further object of the invention is to provide a tool for the purpose referred to with grooves for the passage of chips from the opening being formed, and to further provide one of the walls of each groove at the cutting end of the tool with concavity disposed at an angle with respect to the direction of the length of the groove to cause the lifting of the chips or cuttings out of the opening being formed so as to facilitate the passage of the chips or cutting through the grooves to the point of discharge.

Further objects of the invention are to provide a tool for the purpose set forth which is simple in its construction and arrangement, strong, durable, efficient and convenient in its use, readily set up for operative purposes and comparatively inexpensive to manufacture.

With the foregoing and other objects in view the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1:
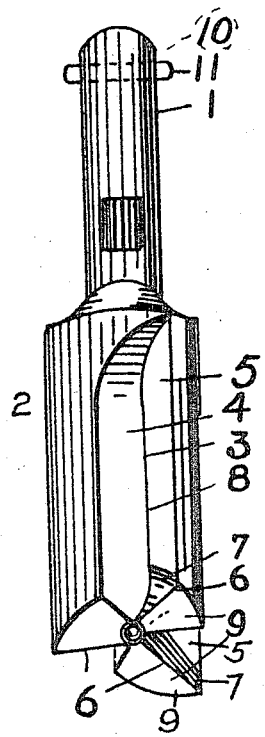
Figure 1 is a perspective view looking toward the cutting end of the tool.
Figure 3:
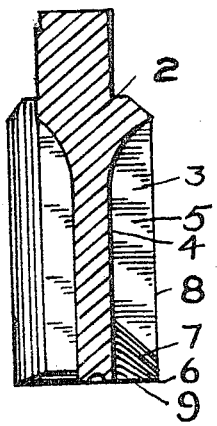
Fig. 3 is a vertical sectional view on line III—III Fig. 2.
Figure 2:
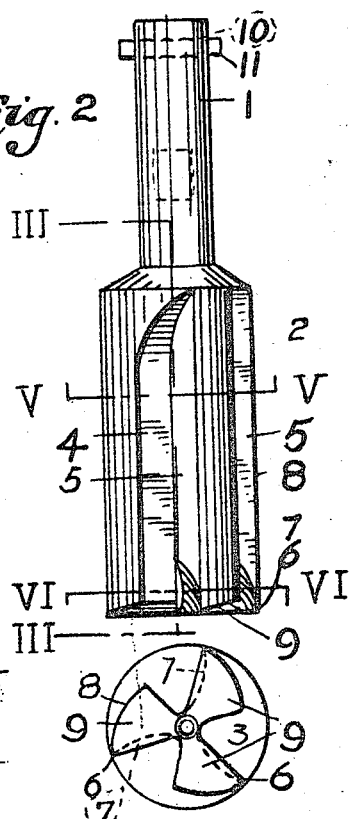
Fig. 2 is an elevation of the tool.
Figure 5:
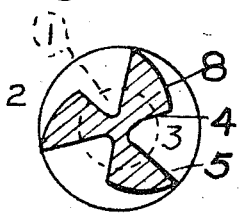
Fig. 5 is a section on line V—V.
Figure 4:
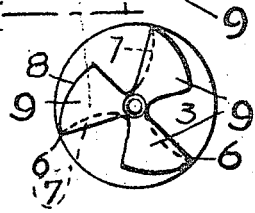
Fig. 4 is an end view of the tool.
Figure 6:
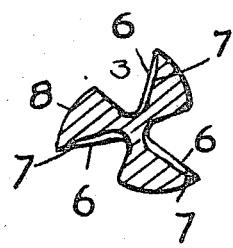
Fig. 6 is a section on line VI—VI.

Referring to the drawings in detail 1 denotes a cylindrical shank which is formed integral with the body portion 2 of the tool, and said body portion 2 is of greater diameter than the shank 1.

The body portion 2 is formed with a plurality of lengthwise grooves 3, as shown three in number and which correspond to the number of cutting edges to be presently referred to. If the number of cutting edges is reduced or increased a like change is had in the number of grooves 3. These latter are employed for the discharge of the chips or cuttings from the opening being formed by the tool. The walls of each of the grooves 3 are indicated at 4, 5, and which are disposed at an angle with respect to each other. The wall 4 is at a greater angle than the wall 5 and is of less depth than the wall 5. The grooves 3 at their rear ends are curved outwardly to direct the discharge of the chips or cuttings away from the shank 1.

The forward terminus of each of the walls 5 provides a cutting edge 6 which is eccentrically disposed with respect to the axis of the body portion 2, and each of the walls 5 in proximity to its forward terminus is formed with a concavity 7 extending at an angle with respect to the groove 3 and which provides the tool with what may be termed a curved cutting lip. The function of the concavities 7 is to cause a lifting of the chips or cuttings out of the openings being formed to prevent clogging and to facilitate discharge thereof through the grooves 3.

The providing of the grooves 3 form the body portion 2 with a plurality of lands 8 and each of which extends from the wall 5 of one groove to the wall 4 of an adjacent groove. The periphery of each land 8, is upon a curve of less radius than the arc corresponding to the arc upon which the body portion is made and which provides the periphery or outer face of each land eccentric with respect to the axis of the body portion. The lands are of equal size and the grooves equi-distant. The reference character 9 denotes a clearance back from each cutting edge 6 allowing the latter to cut freely.

The shank 1 at its rear end is formed with an opening 10 in which is frictionally secured a pin 11, the latter having its ends projecting from the shank 1. The pin 11 is employed when using the shank in a squared tool socket which prevents the turning of the tool. When using the shank in a cylindrical tool socket the pin is removed.

The curving of the periphery of the lands eccentrically with respect to the axis of the body portion 2 will cause the lands to follow the walls of the opening of the master guide, through which the tool operates, in such a manner as to prevent extended or rounded corners at the junction of the walls of the polygonal shaped opening being formed in the work operated on.

The outer terminus of each of the walls 5 is slightly rounded which facilitates the operation of the tool when revolving within the opening of master guide.

What I claim is:—

1. A tool for the purpose set forth comprising a body portion having lands with the periphery thereof disposed eccentrically with respect to the axis of the body portion, said body portion further having one end provided with cutting edges disposed eccentrically with respect to the axis thereof, and said body portion further having lengthwise grooves between the lands, said grooves leading from the cutting edges and each having one wall thereof in proximity to a cutting edge provided with a concavity disposed at an angle with respect to the direction of length of the groove.

2. A tool for the purpose set forth comprising a body portion having lands with the periphery thereof disposed eccentrically with respect to the axis of the body portion, said body portion further having one end provided with cutting edges disposed eccentrically with respect to the axis thereof, and said body portion further having lengthwise grooves between the lands, said grooves leading from the cutting edges and each having one wall thereof in proximity to a cutting edge provided with a concavity disposed at an angle with respect to the direction of length of the groove, a shank integral with said body portion, and each of said grooves having the rear end curved outwardly to discharge the chips or cuttings away from the shank.

3. A tool for the purpose set forth comprising a body portion having lands with the periphery thereof disposed eccentrically with respect to the axis of the body portion, said body portion further having one end provided with cutting edges disposed eccentrically with respect to the axis thereof, and said body portion further having lengthwise grooves between the lands, said grooves extending from the cutting edges.

In testimony whereof I affix my signature in the presence of two witnesses.

HARRY J. WATTS.

Witnesses:
MAX H. SROLOVITZ,
B. E. JENKINS.